(12) United States Patent
Kohnke

(10) Patent No.: US 7,755,905 B2
(45) Date of Patent: Jul. 13, 2010

(54) REMOVABLE HOUSING COVER FOR A PORTABLE RADIO COMMUNICATION DEVICE

(75) Inventor: Axel Kohnke, Dülmen (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/220,116

(22) Filed: Jul. 22, 2008

(65) Prior Publication Data

US 2009/0034210 A1   Feb. 5, 2009

Related U.S. Application Data

(63) Continuation of application No. 10/499,598, filed on Oct. 4, 2004.

(51) Int. Cl.
*H05K 5/00* (2006.01)

(52) U.S. Cl. ..................... 361/730; 361/788

(58) Field of Classification Search ......... 361/715, 361/788, 683, 686; 710/301
See application file for complete search history.

(56) References Cited

U.S. PATENT DOCUMENTS

| 5,023,936 | A | 6/1991 | Szczutkowski et al. | 455/90.2 |
| 5,077,832 | A | 12/1991 | Szczutkowski et al. | 455/566 |
| 5,175,926 | A | 1/1993 | Chapman | 29/830 |
| 5,465,401 | A | 11/1995 | Thompson | 455/558 |
| 5,661,641 | A | 8/1997 | Shindo | 361/814 |
| 5,675,524 | A | 10/1997 | Bernard | 708/109 |
| 5,848,152 | A | 12/1998 | Slipy et al. | 379/433.13 |
| 5,911,121 | A | 6/1999 | Andrews | 455/418 |
| 6,104,168 | A | 8/2000 | Aranovich | 320/136 |
| 6,118,986 | A | 9/2000 | Harris et al. | 455/90 |
| 6,201,540 | B1 | 3/2001 | Gallup et al. | 715/764 |
| 6,201,951 | B1 | 3/2001 | Duwaer et al. | 455/74.1 |
| 6,285,891 | B1 | 9/2001 | Hoshino | 455/567 |
| 6,314,280 | B1 | 11/2001 | Hamel et al. | 455/345 |
| 6,356,543 | B2 | 3/2002 | Hall et al. | 370/352 |
| 6,658,268 | B1 | 12/2003 | Bodnar et al. | 455/556.2 |
| 6,886,724 | B2 | 5/2005 | Hung | 224/163 |
| 2002/0030103 | A1 | 3/2002 | Wycherley et al. | 235/439 |
| 2005/0036293 | A1* | 2/2005 | Kohnke | 361/730 |

FOREIGN PATENT DOCUMENTS

CN   1220060 A   6/1999

(Continued)

OTHER PUBLICATIONS

"Wildseed Smart Skin Intelligent Faceplates", Smartskin Bulletin, 2002, Wildseed Ltd.

*Primary Examiner*—Hung S Bui
(74) *Attorney, Agent, or Firm*—Harrington & Smith

(57) ABSTRACT

The invention provides an electronic mobile communications/entertainment device capable of a plurality of modes of operation, comprising a basic module having circuitry common to the operation of the device in said plurality of modes of operation, and a plurality of supplementary modules, each supplementary module being provided in the form of a housing cover for the device and including controlling means configured to provide for a corresponding mode of operation when coupled to the basic module, the supplementary modules being interchangeably attachable/detachable to the basic module so as to provide respective modes of operation, and the device only being operational when one of said plurality of supplementary modules is attached to the device.

16 Claims, 7 Drawing Sheets

FOREIGN PATENT DOCUMENTS

Figure 1:
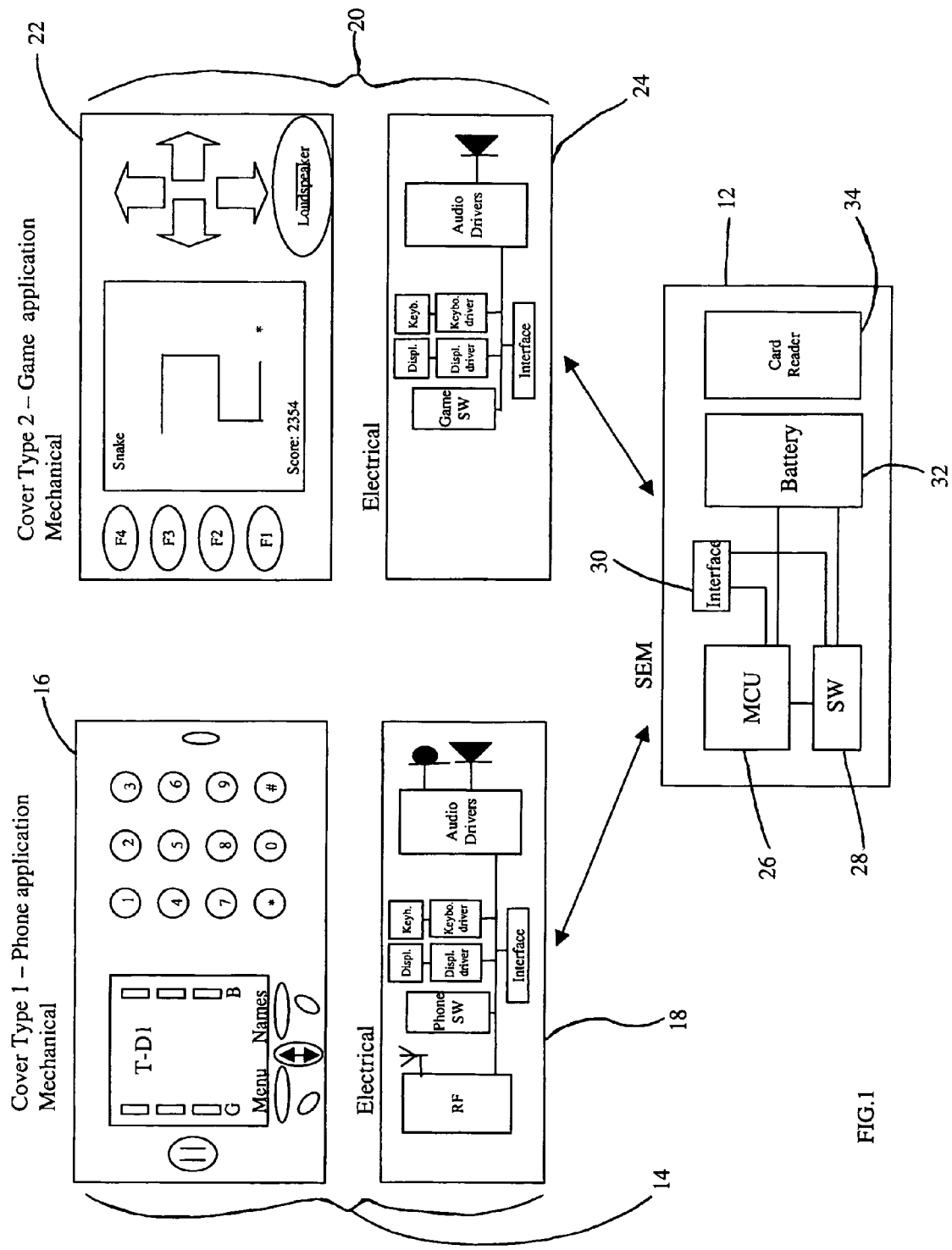

| | | |
|---|---|---|
| EP | 0 521 609 A2 | 5/1992 |
| GB | 2 362 071 A1 | 12/2000 |
| GB | 2355126 A | 4/2001 |
| JP | 10257557 A | 9/1998 |
| WO | WO-97/44912 | 11/1997 |
| WO | WO-02/093956 | 11/2002 |
| WO | WO 03/053026 A2 | 6/2003 |

* cited by examiner

REMOVABLE HOUSING COVER FOR A PORTABLE RADIO COMMUNICATION DEVICE

CROSS REFERENCE TO RELATED APPLICATION

This is a continuation patent application of U.S. patent application Ser. No. 10/499,598 filed on Oct. 4, 2004.

The present invention relates to a portable radio communication device, and more particularly to a suite of removable covers therefor.

Removable covers, such as that disclosed in the Applicant's UK patent number 2,324,929, afford an end-user of a mobile phone disclosed in the said patent the facility to swap the front housing cover of the mobile phone with a different front housing cover selected by the user as he or she wishes. In this way, the end-user is empowered to replace the housing cover if he or she wishes to change the appearance of the mobile phone, or to substitute a broken or scratched housing cover, without having to employ the services of a skilled technician.

Another type of replaceable housing cover is disclosed in Applicant's co-pending patent application number GB 0030048.3 (published as GB 2,362,071). The invention that is disclosed in GB0030048.3 relates to a removable housing cover that is adapted to be detachably connectable to a mobile phone. In one embodiment the removable cover carries some form of embedded data chip, which data chip is designed to be read by a reader on the mobile phone which results in the alteration of the operating characteristics of the mobile phone, e.g. such as a ringtone or a screensaver.

Against this background, the present invention in one aspect provides a removable housing cover adapted to be detachably connectable to a portable radio communication device, said removable housing cover being a user selectable one of a range of different removable housing covers having different respective functionalities, the arrangement being such that when a removable housing cover is connected to the portable radio communication device the device is operationally enabled in accordance with the functionality associated with the connected removable housing cover, and when the removable housing cover is disconnected from the portable radio communication device the device is operationally disabled.

Expressed alternately, the present invention resides in a removable housing cover for a portable radio communication device, said removable housing cover being a user selectable one of a range of different removable housing covers having different respective functionalities, the removable housing cover having a control means, the control means providing the operational instructions for enabling the operation of the portable radio communication device in accordance with the functionality associated with the connected removable housing cover, the operational instructions being arranged to be read by a reader associated with the portable radio communication device, whereby the presence and absence of the removable housing cover in relation to the portable radio communication device renders the device active and inactive respectively.

Conveniently, the operational instructions of the removable housing cover are provided on a memory chip, and said memory chip is used as a memory extension for the portable radio communication device when the removable cover is present on the portable radio communication device. In this sense, the operational instructions are not read by a reader as such, but are interfaced with the memory of the portable radio communication device.

By means of this invention, the absence of presence of the removable housing cover in relation to the portable radio communication device determines whether or not the device can be used. Thus, the user of the portable radio communication device is able himself/herself not only to change the outward appearance of the phone, but also to enable/disable the device, which because this requires the presence/absence of a physical component of the device (i.e. the removable housing cover), the invention leads to increased security for the user against unauthorised use of the device. Also, the portable radio communication device can be economically produced, as it implements only limited common functionalities and customisation is achieved with the removable housing cover.

In one form of the invention, the control means that is carried by the removable housing cover comprises a processor for the portable radio communication device, whereby when the removable housing cover is placed on the portable radio communication device, the processor co-operates with the electronic circuitry of the device thereby to provide for an operational device.

In a further embodiment, the device is without an operating system and/or application software, and the removable housing cover includes an operating system and/or application software for the device. In this way, the connection of the removable housing cover with the device renders the device operational.

The removable housing cover may include the RF circuitry for the communication device, in which case the RF circuitry would not be present in the device.

In general terms, the approach taken in the present invention is as follows. The removable housing cover is equipped with one or more application specific elements to provide some given functionality; the application elements may be embodied in a readable software module, or connectable electronics hardware. When the user wishes to change the user interface, or the type of application, he/she removes the housing cover currently attached to the phone, for example by using the releasable attachment means described in the Applicant's patent referenced above, the releasable attachment aspects of which are incorporated herein by reference. Then the new housing cover that the user wishes to install onto the phone is located onto the phone and secured in position, again making use of the releasable attachment means. Once in place, the application elements of the removable housing cover interface in a way that co-operates with a corresponding interfacing element provided on the device. When the interfacing element on the device senses the presence of the application element of the removable housing cover, this enables the device to be activated and to operate in accordance with the application element of the removable housing cover.

For instance, a user may purchase a removable housing cover with games software functionality. On connecting the housing cover to the phone, the phone is enabled with the ability to allow playing of the particular game. In this way, the phone conveniently is accompanied with a dedicated User Interface that is adapted to game playing.

In another aspect, the invention provides an electronic mobile communication/entertainment device capable of a plurality of modes of operation, comprising a basic module having circuitry common to the operation of the device in said plurality of modes of operation, and a plurality of supplementary modules, each supplementary module being provided in the form of a housing cover for the device and including controlling means configured to provide for a corresponding mode of operation when coupled to the basic module, the supplementary modules being interchangeably attachable/detachable to the basic module so as to provide respective modes of operation, and the device only being operational when one of said plurality of supplementary modules is attached to the device.

This alleviates the problem experienced when using conventional personal communication devices which typically offer a variety of different applications, but in which any one particular User Interface (UI) cannot facilitate all functionalities corresponding to the different applications in an optimal manner.

In addition, since the basic module includes only a base level of common circuitry and the attachable/detachable supplementary modules contain much of the componentry required to support the particular application, the cost of the basic module can be relatively modest.

Hence, this aspect of the invention offers the possibility to purchase a basic module for a comparatively low price, and add to this, at the choice of the user, one or more supplementary modules in the form of housing covers, thereby providing for applications and functions that the user wishes to have. This aspect of the invention further benefits in that because for a given application the attached housing cover provides a UI that is specially dedicated to that application, the user is able to use the application in the most convenient and user friendly way. Furthermore, any particular housing cover may provide some very basic functionalities for other applications.

Figure 2:
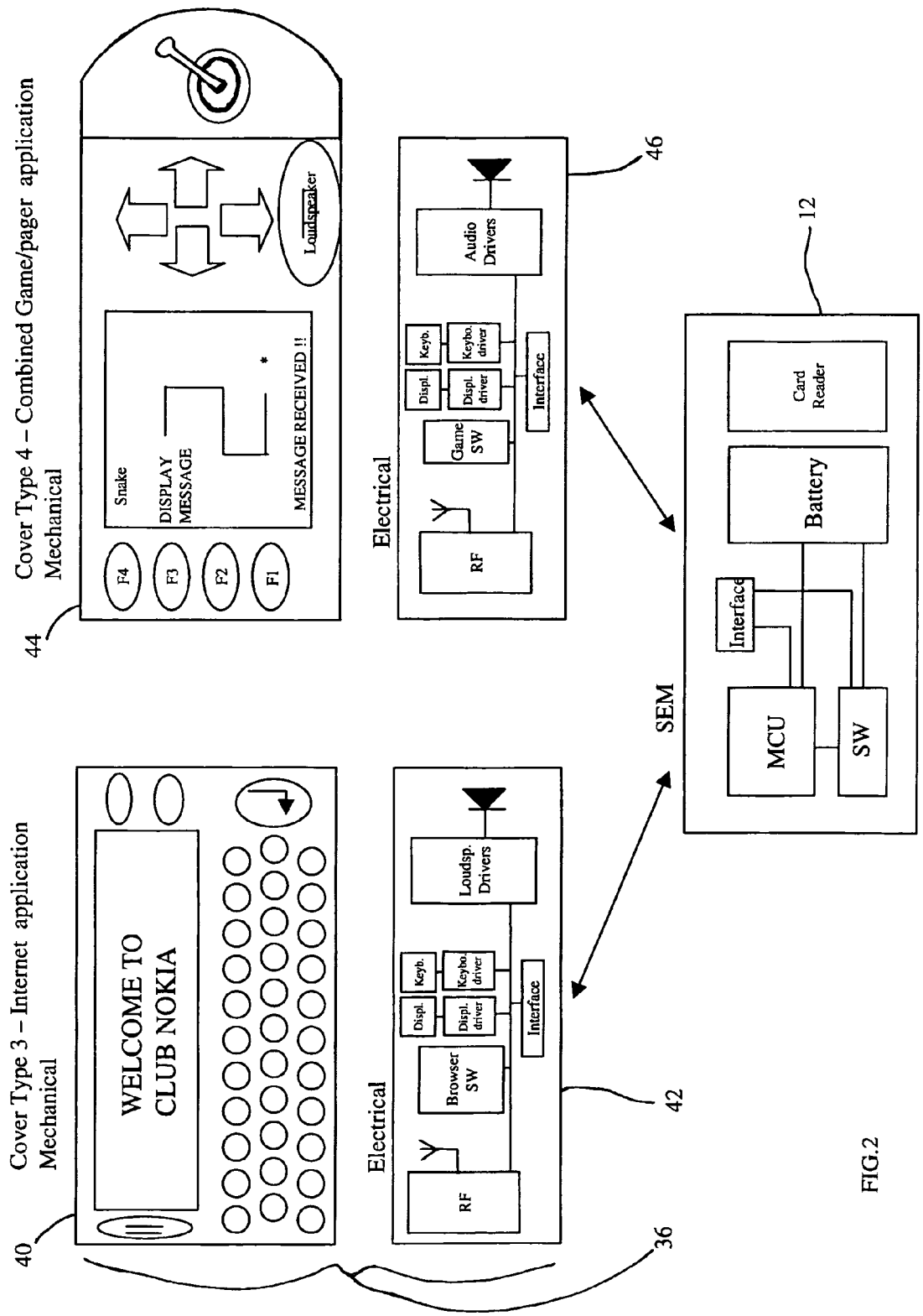
Figure 3:
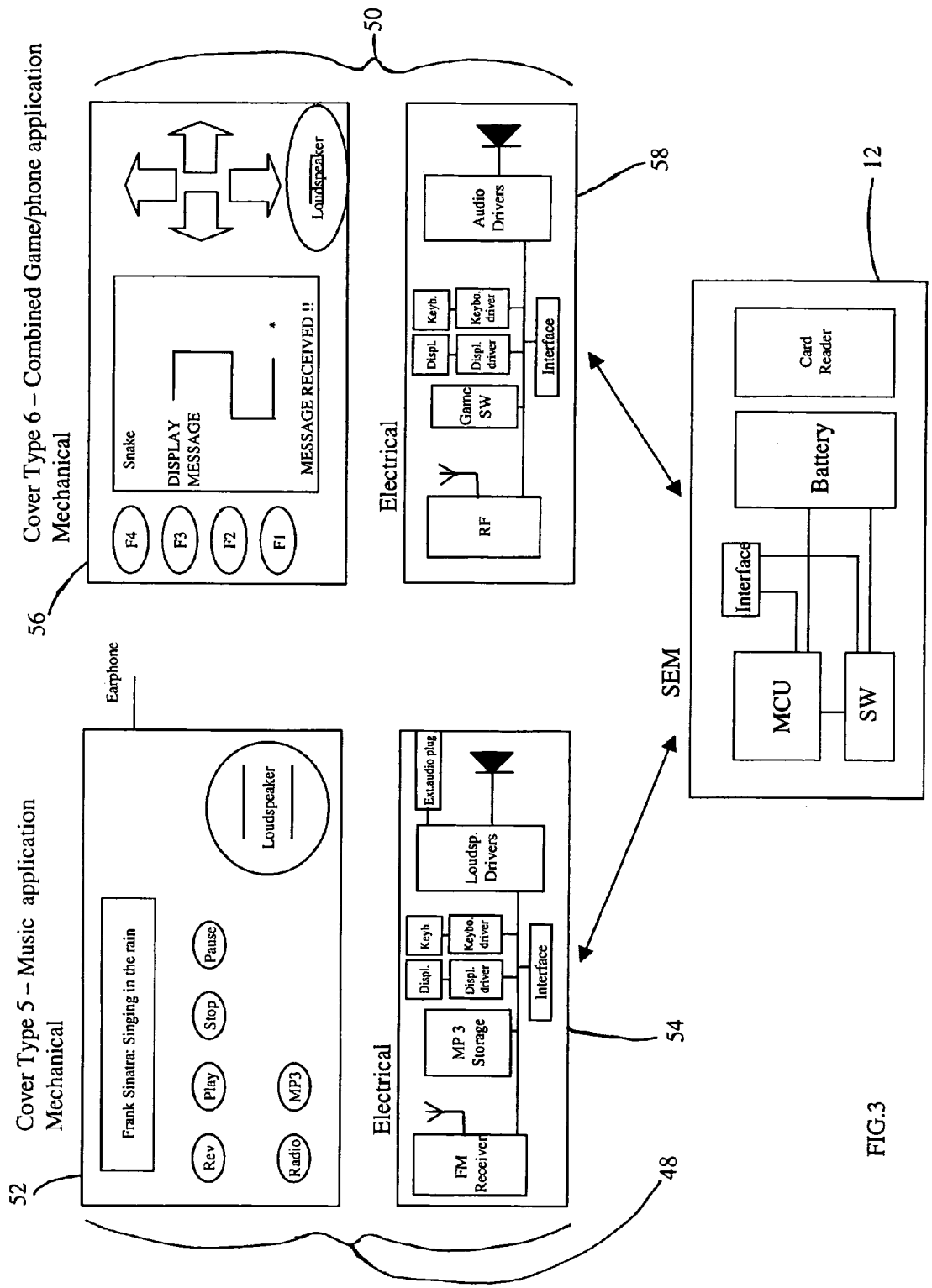
Figure 4:
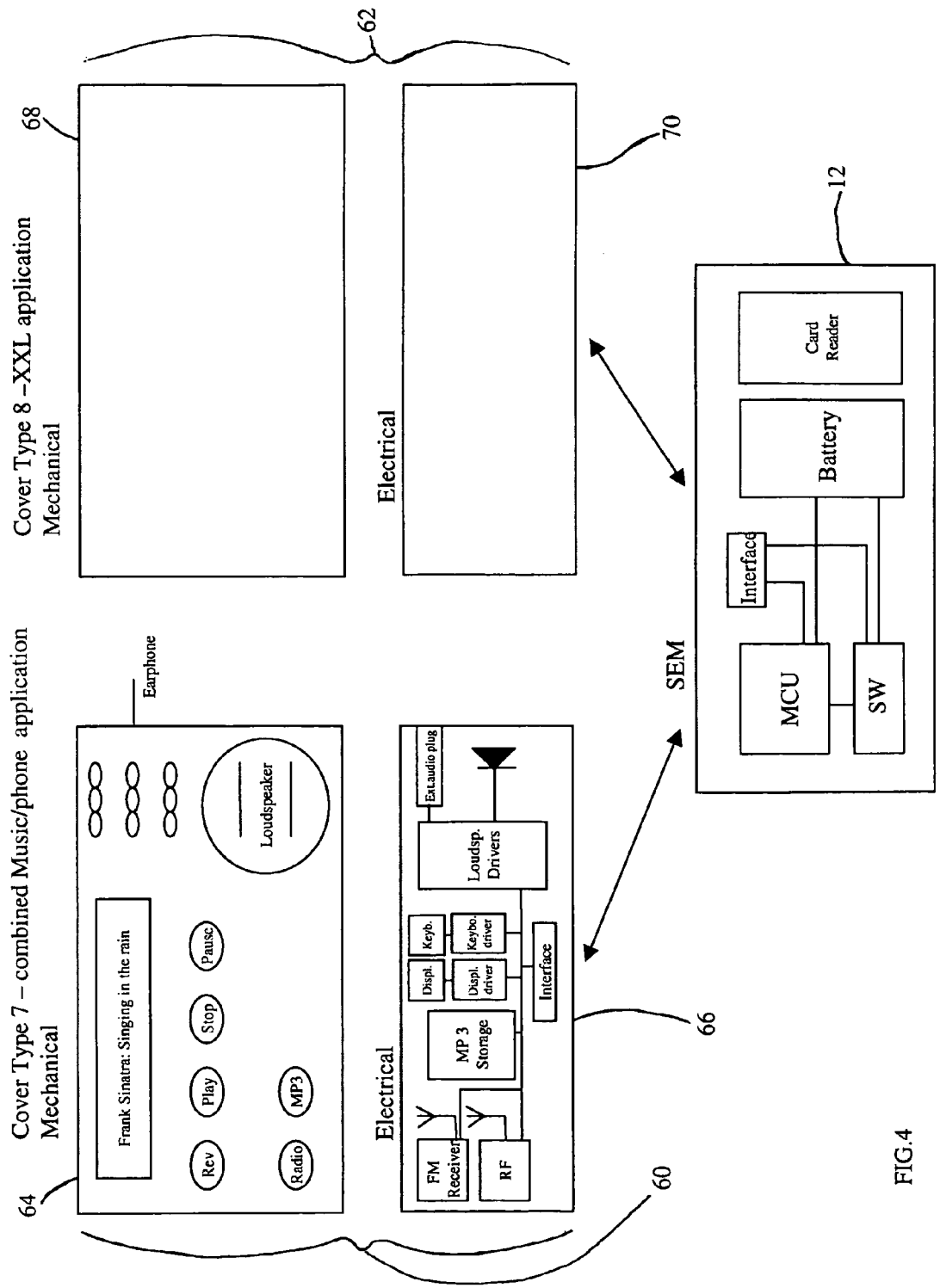
Figure 5:
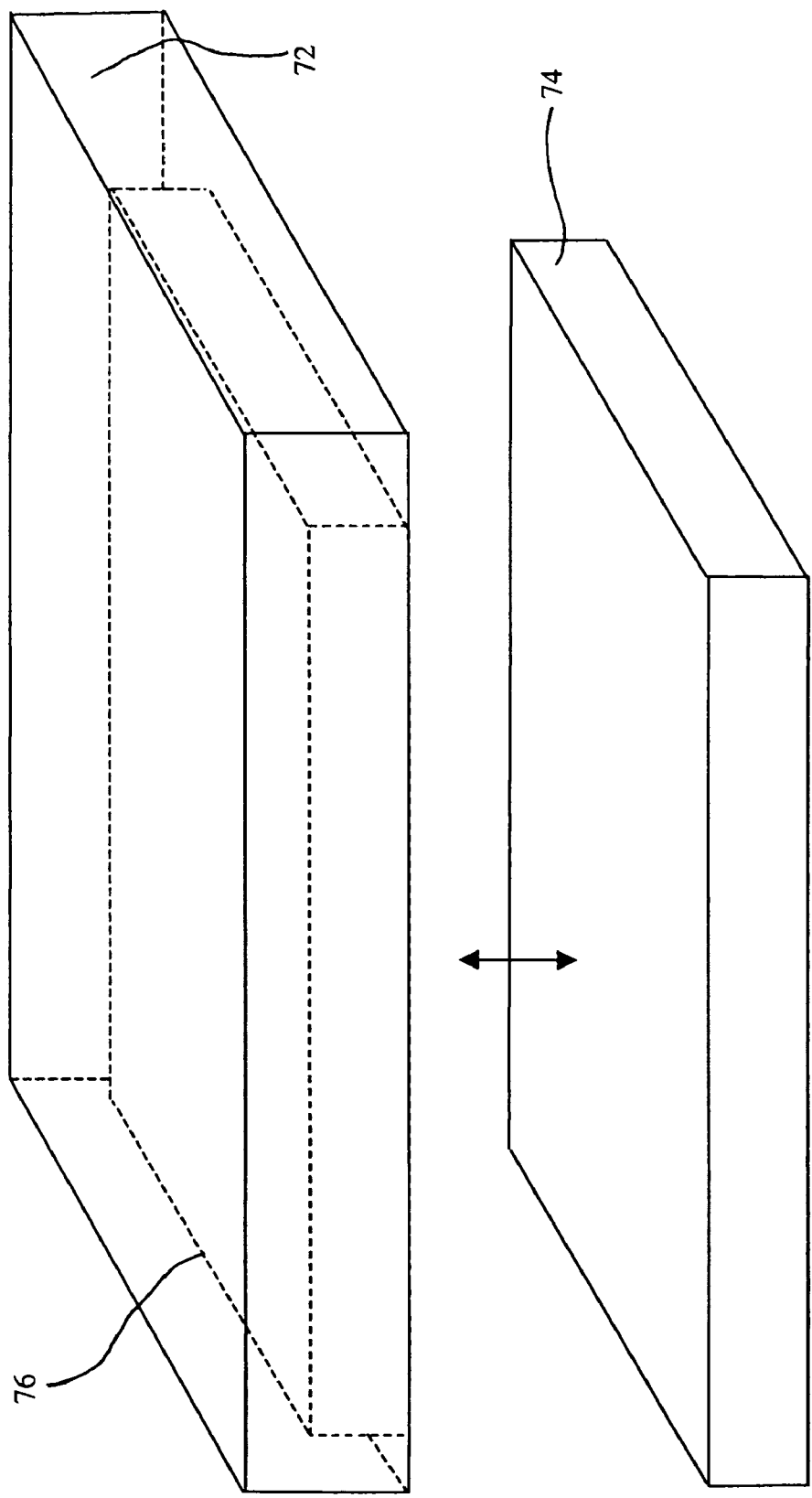
Figure 6:
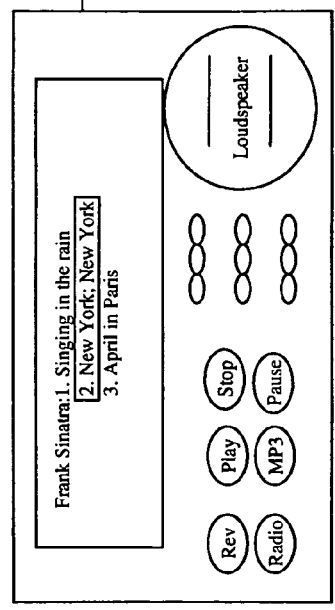
Figure 6:
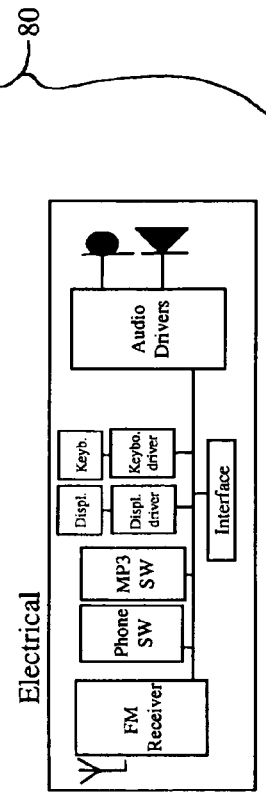
Figure 6:
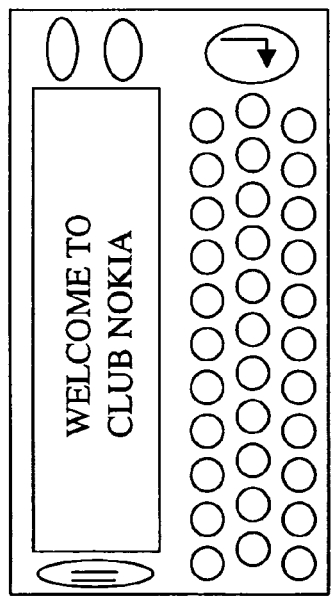
Figure 6:
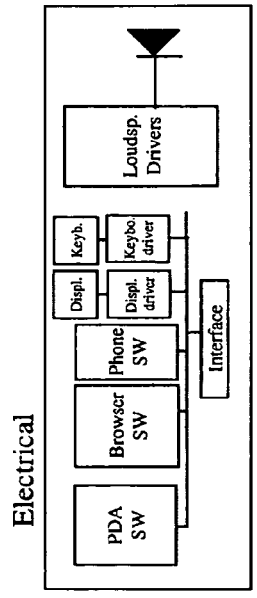
Figure 6:
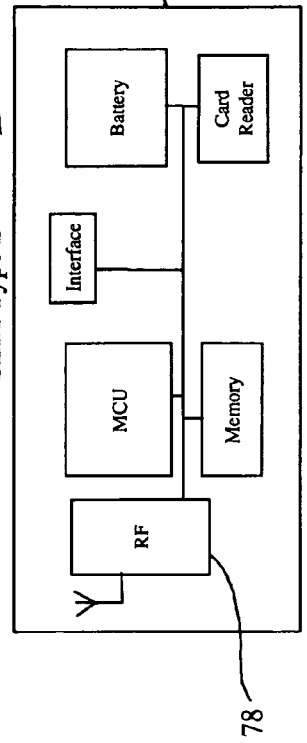
Figure 7:
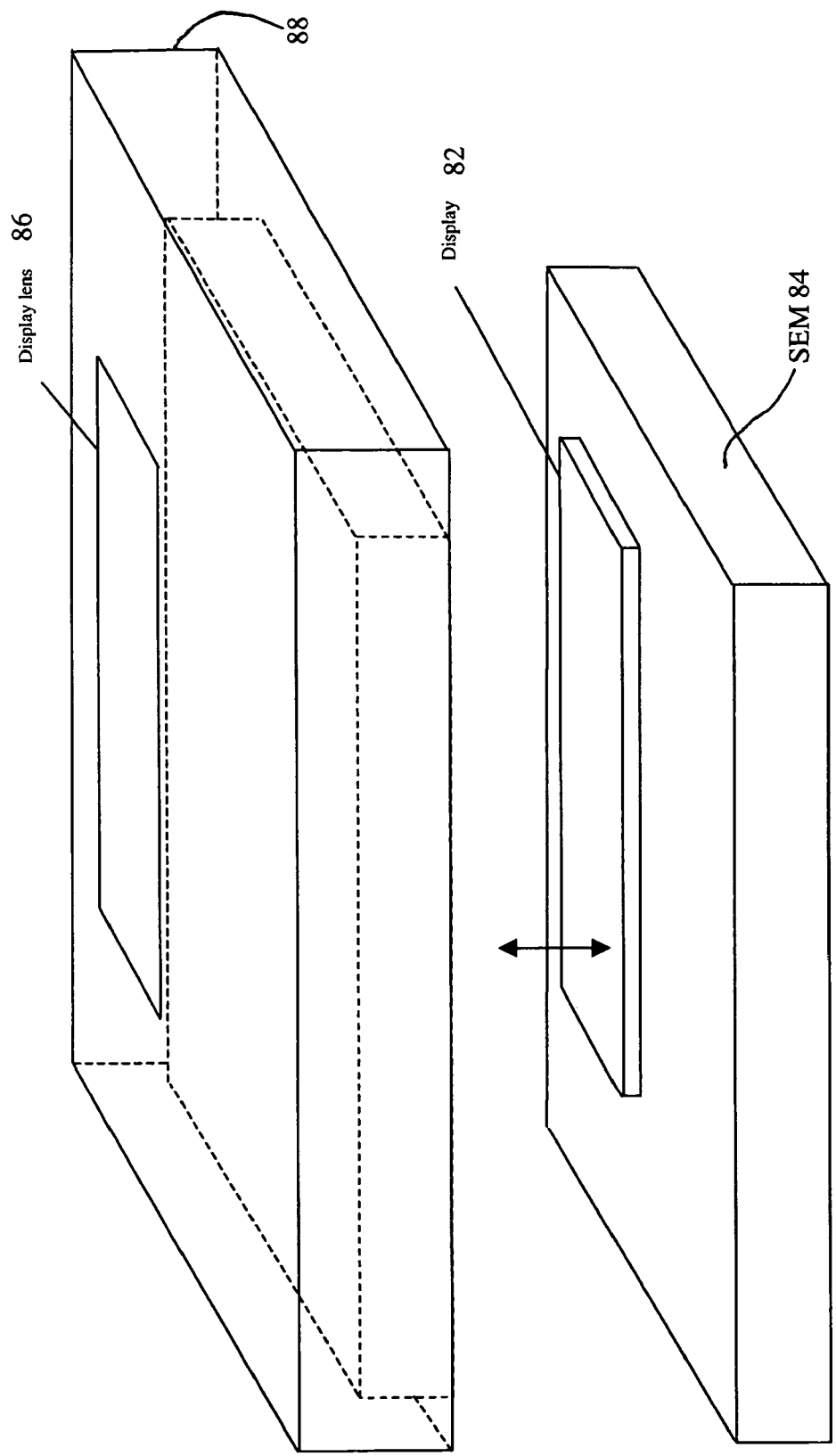

In order to aid a more detailed understanding of the present invention, various embodiments of the invention will now be described. These should not be construed as necessarily limiting the invention but merely as examples of specific ways of putting the invention into effect. In particular, the invention will be described with reference to the accompanying drawings in which:

FIG. 1 illustrates one embodiment of the invention;
FIG. 2 illustrates a second embodiment of the invention;
FIG. 3 illustrates a third embodiment of the invention;
FIG. 4 illustrates a fourth embodiment of the invention;
FIG. 5 illustrates a mechanical form of the invention;
FIG. 6 illustrates a further embodiment of the invention and
FIG. 7 illustrates a further mechanical form of the invention.

FIG. 1 shows an embodiment of the present invention comprising a basic module 12 in the form herein termed a Standard Entertainment Module (SEM) which in and of itself is inoperative. FIG. 1 also shows a first supplementary attachable module 14 in the form of a removable housing cover 16 which is provided with an application controller 18 providing phone functionality. When the removable cover 16 is attached to the SEM the application controller 18 interfaces with the SEM so as to render it operative in accordance with the application controller, thereby to provide standard phone functionality. FIG. 1 further shows a second supplementary attachable module 20 in the form of a removable housing cover 22 which is provided with an application controller 24 providing games functionality. When the removable cover 22 is attached to the SEM the application controller 24 interfaces with the SEM so as to render it operative in accordance with the application controller, thereby to provide games functionality. Thus it can be seen that the removable housing covers 16 and 22 can be interchangeably attached to the SEM to provide for phone and gaming functionalities respectively.

The features of the SEM 12 include:
Microprocessor MCU 26,
Software storage SW 28,
Interface 30
Battery 32,
Card Reader 34.

It is preferred to include the card reader 34 in the SEM because this may be constructional more practical than placing the card reader in the housing cover. The card reader 34 of the SEM might also be useful for taking other kinds of memory cards for memory extension and the like.

The SEM may contain other components and circuitry common to the different modes of operation of the SEM. For instance, the SEM may include RF circuitry for a particular cellular communication mode of operation. Equally, the SEM may include fewer components than those described above if certain components can be dispensed with. For instance, the RF circuitry may be absent from the SEM in which case the SEM is adapted to operate in different telecommunication protocols by connecting different covers having for instance GSM, TDMA, UMTS capabilities.

As indicated above, the first supplementary attachable module 14 takes the form of a removable housing cover 16 which is provided with an application controller 18 providing phone functionality. Because the removable cover 16 is designed to provide phone functionality, the User Interface (UI) of the removable cover consists of features necessary for carrying out phone operations. Thus the UI includes a microphone and earpiece, a keypad, a display and menu and control buttons. The application controller 18 associated with the removable cover 16 has components necessary for making and receiving calls, both voice and data, and thus includes e.g. RF circuitry, baseboard software, drivers etc. When the removable cover 16 is snapped onto the SEM 12 the components of the application controller 18 connect up and cooperate with the components of the SEM to enable phone functionality.

Also as indicated above, the second supplementary attachable module 20 takes the form of a removable housing cover 22 which is provided with an application controller 24 providing games functionality. In this case because the removable cover 22 is designed to provide games functionality, the User Interface (UI) of the removable cover 22 consists of features necessary for carrying out gameplay operations. Thus the UI directions keys (or a joystick), a display, and other control buttons. The application controller 24 associated with the removable cover 22 has components necessary for playing computer/video games, and thus includes e.g. memory for games software, drivers etc. When the removable cover 22 is snapped onto the SEM 12 the components of the application controller 24 connect up and cooperate with the components of the SEM to enable games functionality.

Turning to FIG. 2, there is shown a second embodiment of the invention in which there is an SEM 12 of the type described above, along with two supplementary modules 36 and 38 which can be interchangeably attached to the SEM 12. Supplementary module 36 comprises a removable housing cover 40 which is provided with an application controller 42 providing browsing functionality, so that when the removable cover 40 is attached to the SEM 12 the application controller 42 interfaces with the SEM so as to provide for browsing of the internet. Thus, the removable cover 40 has a UI designed for allowing user friendly browsing, and hence may include a wide display and a QWERTY keypad, as well as control keys. The application controller 42 correspondingly includes browser software and RF circuitry, etc.

Supplementary module 38 comprises a removable housing cover 44 which is provided with an application controller 46 providing combined games and pager functionalities, so that when the removable cover 44 is attached to the SEM 12 the application controller 46 interfaces with the SEM so as to allow for gaming and pager functions. Thus, the removable cover 44 has a UI designed for allowing user friendly gaming and pager messaging, and hence may include a display, games control keys, etc. The application controller 46 correspondingly includes gaming software and pager componentry, etc.

Supplementary modules that provide for combined applications may be advantageous in particular circumstances, for example for a child who is allowed by his parents to use the SEM with a games cover may find a pager functionality useful for receiving short messages (e.g. "Lunch is ready, come home!"). Analogously, in another embodiment, a music application cover might also offer some basic phone functionalities to handle phone calls.

FIG. 3 illustrates a further embodiment of the invention in which there is an SEM 12 of the type described above, and two supplementary modules 48 and 50 which can be interchangeably attached to the SEM 12. Supplementary module 48 comprises a removable housing cover 52 which is provided with an application controller 54 providing music functionality, so that when the removable cover 52 is attached to the SEM 12 the application controller 54 interfaces with the SEM so as to provide music applications. Thus, the removable cover 52 has a UI designed for allowing user friendly music controls, and hence may include control keys such as PLAY, SKIP, EDIT, MP3, RADIO etc. The application controller 54 correspondingly includes a broadcast radio receiver, MP3 software and storage, etc.

Supplementary module 50 is a further example of a combined application module which comprises a removable housing cover 56 with an application controller 58 that is capable of providing both games and phone functionalities, so that when the removable cover 56 is attached to the SEM 12 the application controller 58 interfaces with the SEM so as to allow for gaming and phone functions. Thus, the removable cover 56 has a UI designed for allowing user friendly gaming and call handing, and hence may include a display, games control keys, etc. The application controller 46 correspondingly includes gaming software and mobile phone componentry, etc.

FIG. 4 illustrates a further embodiment of the invention in which there is an SEM 12 of the type described above, and two supplementary modules 60 and 62 which can be interchangeably attached to the SEM 12. Supplementary module 60 comprises a removable housing cover 64 which is provided with an application controller 66 providing music and phone functionality, so that when the removable cover 64 is attached to the SEM 12 the application controller 66 interfaces with the SEM so as to provide music and phone applications. Thus, the removable cover 64 has a UI designed for allowing user friendly music and phone controls, and hence may include control keys such as PLAY, SKIP, EDIT, MP3, RADIO, as well as an earpiece and loudspeaker etc. The application controller 66 correspondingly may include a broadcast radio receiver, MP3 software and storage, RF circuitry, baseboard software etc.

Supplementary module 68 is a general representation of an unspecific module which illustrates the mechanical and electrical sub components of a module.

In use there are possibilities of overlap of functionality. For example, the phone function cover might provide a convenient way of storing phone numbers in a phonebook that could be stored in a memory of the SEM. The internet cover offers a convenient keyboard for adding names to the phonebook entries which may also be stored on the SEM. When the user elects to use the music application cover he might be content just to access the phonebook with some keystrokes and choose a name for dialing and making a phone call. Also the covers may allow for voice dialing which enables to make phone calls without having a keyboard for number/name selection while using the games or music cover.

Referring to FIG. 5, there is shown a schematic arrangement for connecting a supplementary module 72 to the basic module 74. In this arrangement the supplementary module receives the basic module within a cavity or recess 76 that is defined by the walls of the removable cover supplementary module.

FIG. 6 illustrates a further variant of the invention; in this variant the SEM is modified in that it also includes a radio transceiver 78 which is desirable for a user who wishes to have communication possibility always enabled. In this case the supplementary attachable modules do not require to have transceiver, but may simply have UI features that allow use sending and receiving calls. Thus FIG. 6 illustrates two supplementary modules 78 and 80 both of which (although separately providing Internet/PDA and Music applications) can be used to place and receive calls. Supplementary module 78 is an Internet/PDA removable cover optimised in its design for Browsing and PDA operations. This is particularly advantageous because the QWERTY keyboard preferred for internet browsing also provides good capability for entering text and other PDA software functions and therefore it is beneficial to add PDA functionality to the cover because a user might wish to use the device for calendar applications, extended phone book function, document control and other functions associated with a PDA. The SEM may contain basic phone SW, while the application SW of the phone for internet browsing and aural communication is conveniently provided in the cover.

The embodiment of FIG. 6 has a bus structure like connection between the modules in the SEM which provides for more simplified interconnection. The interface between cover and SEM can be named Application Programming Interface API. The SEM interfaces the removable housing cover through a dedicated Application Programming Interface (API). The API specifies how the functionalities of the removable housing cover and the standard functionalities provided by the SEM work together in order to form a product that operates according to the users needs. The API may consist of a set of pre-defined messages that can be exchanged between the SEM and the removable housing cover in order to access the provided functions in the SEM and cover.

Furthermore, in the embodiment of FIG. 6, there is a block labelled "Memory" which corresponds to the blocks labelled SW in the SEM of the embodiments of FIGS. 1 to 4. This indicates that the "Memory" of the SEM of the Figure embodiment, without an attached cover, may not contain SW as such, but instead provides the storage capacity for the SW from the cover. The same can apply to all the previously described embodiments, meaning that rather than storing SW in a memory, they provide only memory which can be loaded with SW from the attached cover. Additionally, it is, in further variants, possible for the SEMs to contain no memory as such, since in such variant it is possible for the MCU of the SEM to access the SW in the cover through the API, in which case the API is a hardware interface comprising a wired connection between the MCU of the SEM and the memory chip in the cover. In such a variant the SW API is a portion of a more extensive hardware and software interface.

The SEM may also comprise a display and in this case the removable covers simply provide the display lens. This is illustrated in FIG. 7 which shows a display 82 being provided with the SEM 84, and a display lens 86 being provided with the removable cover 88. Alternatively, the SEM might also contain a display with an integrated lens, in which the housing cover does not cover the display and merely has an aperture configured for alignment with the lens.

For all embodiments, it may be that the SW relating to an attached cover is erased from the SEM memory upon removal of the cover.

Thus, it can be seen that the SEM holds functionality common to a wide variety of different applications, while the removable cover adds specific functionality that adapts the SEM plus cover to the user's needs.

In another form of the invention, the application controller comprises in a memory chip patch that carries data associated with the particular removable cover. The memory chip patch may be embedded during manufacture in the inside surface of the removable cover.

When a new removable cover is installed onto the SEM and secured in position, the memory chip patch of the removable housing cover are brought into registration with a sensor in the form of a reader provided in the SEM. This reader detects the memory chip patches of the removable housing cover and proceeds to read data from it.

Hence, the reader reads information of the memory chip and certain predefined functionality is transferred to a controller/processor of the SEM. This transfer of data causes the SEM to become operational in accordance with the data transferred from the chip patch.

Thus, it can seen that a user can personalise and customise the SEM by the means of choice of removable cover. By combining the SEM with a given cover, the user can generate a usable product that meets his/her particular current requirements. In addition to the embodiments described above, further examples include:

| | |
|---|---|
| SEM + cover with ITU-Keypad (Phone Keypad) | Phone centric usage |
| SEM + cover with Joystick | dedicated for playing games |
| SEM + cover with SENSORS | dedicated for special purposes |

Depending on the sensor, there will be a dedicated design and dedicated SW to process the sensor data. Some examples include:
Noise meter—Special design of the cover and special functionality to perform noise measurements,
Distance meters—Special design and functionality to perform distance and area measurements; may be useful for builders and architects,
Humidity, Temperature, Air Pressure—Wearable weather station,
GPS Sensor—For navigation, this may require to have a dedicated display for map display,
Sunshine Intensity sensor—personal device to measure the exposure to UV-Rays to prevent sunburn.

| | |
|---|---|
| SEM + cover with specific Memory Device | Memory Extension (e.g. for MP3) |
| SEM + cover with ROM (Game inside) | Cover + Game inside as a bundle |
| SEM + cover with extra MCU + Memory | Extension of device functionality |

This provides a flexible and substantially future-proof variant of the SEM. The MCU allows the cover to execute its applications without exposing any load to the SEM Microcontroller.

| | |
|---|---|
| SEM + cover with Adaptation unit | Smart Adapter |

The adaptation unit may be for example some means for connecting to other devices such games consoles, PCs, PDAs, TVs, USBs etc.

In an advantageous embodiment, a cover may contain some functionality that entitles the user do download applications or games from a remote server/service, e.g. Club Nokia. Thus, the SEM may be equipped to download data e.g. from the Internet and transfer this data to a supplementary module application controller. E.g. it may be possible to download a JAVA applet into a Virtual Machine in the Cover MCU. The grant to download of applications may be included in the purchase of the cover. In this case the user can customise his device via the Web.

Thus, according to the invention, the user can build up a suite of removable covers relating to the different applications which the user is interested in owning.

The present invention may be embodied in other specific forms without departing from its essential attributes For instance, the mobile phone covers could comprise touch-screen keys rather than a keypad. Reference should thus be made to the appended claims and other general statements herein rather than to the foregoing description as indicating the scope of invention.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalisation thereof irrespective of whether or not it relates to the claimed invention or mitigates any or all of the problems addressed.

The appended abstract as filed herewith is included in the specification by reference.

The invention claimed is:

1. A housing cover for an electronic device, the housing cover comprising:
an attachment portion configured to enable the housing cover to be removably electrically attachable/detachable by a user to a basic module of the electronic device;
a controller configured to enable a mode of operation to be provided such that when the housing cover is attached to the basic module the controller is configured to interface with common circuitry of the basic module to provide said mode of operation wherein;
the controller of the housing cover comprises one or more of: a mobile phone application for a telecommunication mode of operation, an electronic gaming application for a gaming mode of operation, an internet browsing application for a browsing mode of operation, a pager application for a pager mode of operation, a music application for a music mode of operation, a PDA for a PDA mode of operation;

the housing cover is arranged such that when attached to the basic module, the electronic device is operationally enabled to provide the respective mode of operation and wherein, when detached from the basic module, the electronic device is operationally disabled.

2. The housing cover according to claim 1, wherein the controller of the housing cover comprises one or more control elements for multi-functional modes of operation corresponding to two or more combinations of the controller.

3. The housing cover according to claim 1, wherein the housing cover comprises a memory, and the cover is arranged such that, when the housing cover is attached to the basic module, the housing cover memory may be accessed by the basic module to enable the mode of operation of the device to be provided.

4. The housing cover according to claim 1, wherein the housing cover comprises an operating system and the housing cover is arranged such that, when the housing cover is attached to the basic module, the basic module may use the operating system to provide the respective mode of operation of the device.

5. The housing cover according to claim 1, wherein the housing cover comprises RF circuitry to provide wireless communication for the device where the housing cover is attached to the basic module, wherein the housing cover is arranged such that the basic module can use the RF circuitry of the housing cover to provide wireless communication, the basic module itself not comprising RF circuitry.

6. The cover according to claim 1, wherein the housing cover comprises much of the circuitry, compared to the basic module, to provide the modes of operation of the device.

7. The housing cover according to claim 1, wherein the cover comprises a user interface dedicated to the mode of operation which the controller of the housing cover provides.

8. The housing cover according to claim 1, wherein the controller is configured to download a mode of operation from a remote server/service.

9. The housing cover according to claim 1, wherein the housing cover comprises circuitry to provide for a navigation mode of operation.

10. The housing cover according to claim 1, wherein the housing cover comprises circuitry to provide for one of noise measurement and distance measurement modes of operation.

11. A basic module, for an electronic device, the basic module comprising:

an attachment portion configured to enable the basic module to be removably electrically attachable/detachable by a user to a housing cover;

common circuitry wherein the common circuitry may be controlled to enable the operation of the electronic device in a plurality of modes of operation;

an interface configured such that when a housing cover is attached to the basic module the common circuitry is controlled by a controller of a housing cover to enable a mode of operation of the electronic device to be provided;

and wherein the basic module is arranged such that when attached to a housing cover, the electronic device is operationally enabled to provide the respective mode of operation associated with the attached housing cover and wherein, when detached from the housing cover, the electronic device is operationally disabled.

12. The basic module as claimed in claim 11 wherein the basic module is configured to be removably electrically attachable/detachable by a user to any one of a plurality of different housing covers and the mode of operation provided by the electronic device is determined by the housing cover which is attached to the basic module.

13. The basic module as claimed in claim 11 wherein the basic module comprises a power source.

14. The basic module as claimed in claim 13 wherein the interface as configured such that when the housing cover is attached to the basic module the power source of the basic module provides power to the housing cover.

15. The basic module as claimed in claim 11 wherein the basic module comprises a microprocessor, a memory, and a reader.

16. An electronic device having a plurality of modes of operation comprising:

a basic module as in claim 11; and a housing cover comprising an attachment portion and a controller, wherein the attachment portion is configured to enable the housing cover to be removably electrically attachable/detachable by a user to the basic module of the electronic device, wherein the controller is configured to enable a mode of operation to be provided such that when the housing cover is attached to the basic module the controller is configured to interface with common circuitry of the basic module to provide said mode of operation wherein, the housing cover is arranged such that when attached to the basic module, the electronic device is operationally enabled to provide the respective mode of operation and wherein, when detached from the basic module, the electronic device is operationally disabled.

* * * * *